United States Patent
Bishop

(10) Patent No.: US 7,804,056 B2
(45) Date of Patent: Sep. 28, 2010

(54) ENERGY SIGNAL PROCESSING SYSTEM

(75) Inventor: Mark Vincent Bishop, Roselands (AU)

(73) Assignee: Ocular Robotics Pty Limited, New South Wales (AU)

( * ) Notice: Subject to any disclaimer, the term of this patent is extended or adjusted under 35 U.S.C. 154(b) by 0 days.

(21) Appl. No.: 12/079,455

(22) Filed: Mar. 27, 2008

(65) Prior Publication Data

US 2008/0239430 A1  Oct. 2, 2008

Related U.S. Application Data

(63) Continuation of application No. PCT/AU2006/000754, filed on Jun. 2, 2006.

(30) Foreign Application Priority Data

Sep. 27, 2005  (AU)  ............................. 2005905319

(51) Int. Cl.
*G02B 26/10* (2006.01)
*G02B 7/198* (2006.01)
(52) U.S. Cl. ............... 250/234; 359/196.1; 359/225.1; 359/226.1; 359/226.2; 359/430; 126/600
(58) Field of Classification Search ............ 250/234; 359/196.1, 223.1, 225.1, 226.1, 226.2, 429, 359/430; 126/600–608
See application file for complete search history.

(56) References Cited

U.S. PATENT DOCUMENTS

| | | | |
|---|---|---|---|
| 2,326,552 A | 8/1943 | Morse | |
| 3,893,746 A | 7/1975 | McMahon | |
| 4,024,392 A | 5/1977 | Teppo et al. | |
| 4,195,905 A | * | 4/1980 | Hansen ............ 126/604 |
| 4,400,066 A | 8/1983 | Byers | |
| 4,626,063 A | 12/1986 | Honey | |
| 4,787,725 A | * | 11/1988 | Preussner et al. ........... 359/401 |
| 4,825,218 A | 4/1989 | Begout et al. | |

(Continued)

FOREIGN PATENT DOCUMENTS

DE  299 03 574  7/1999

(Continued)

OTHER PUBLICATIONS

English Abstract of JP 2002-168232 dated Jun. 14, 2002.

(Continued)

*Primary Examiner*—John R Lee
(74) *Attorney, Agent, or Firm*—Ladas and Parry LLP

(57) ABSTRACT

An energy signal processing system (10) includes a first shaft assembly (14) rotatable about an azimuth axis (16), and a second shaft assembly (18) coaxially mounted for rotation about the azimuth axis (16). The first shaft assembly (14) defines a zenith plane (20) inclined with respect to the azimuth axis (16). The system (10) includes an energy signal processing element (22) rotatable about a processing element axis (24) that intersects and is generally perpendicular to the azimuth axis (16), as well as a means for rotating the element (22) about the element axis (24) such that: energy signals travelling substantially along a preselected path axis (12) and impinging the energy signal processing element (22) are processed or deflected substantially along the azimuth axis (16); or vice versa; or energy signals generated by the energy signal processing element (22) are directed substantially along the preselected path axis (12).

23 Claims, 6 Drawing Sheets

U.S. PATENT DOCUMENTS

| | | | |
|---|---|---|---|
| 4,832,425 A | | 5/1989 | Walther et al. |
| 4,883,348 A | | 11/1989 | Spivey et al. |
| 4,923,263 A | | 5/1990 | Johnson |
| 5,187,612 A | | 2/1993 | Plesko |
| 5,517,204 A | | 5/1996 | Murakoshi et al. |
| 6,034,803 A | * | 3/2000 | Sullivan et al. .......... 359/196.1 |
| 6,556,598 B1 | | 4/2003 | Angott |
| 6,914,578 B1 | * | 7/2005 | Menahem ................... 343/877 |
| 7,038,709 B1 | * | 5/2006 | Verghese ..................... 348/169 |
| 2004/0179847 A1 | | 9/2004 | Johnson et al. |
| 2008/0239430 A1 | * | 10/2008 | Bishop ....................... 359/196 |

FOREIGN PATENT DOCUMENTS

| | | |
|---|---|---|
| GB | 1220533 A | 1/1971 |
| GB | 1 272 741 | 5/1972 |
| GB | 2 280 787 | 2/1995 |
| JP | 2002-168232 | 6/2002 |
| RU | 2031308 C1 | 3/1995 |
| SU | 1810941 A1 | 4/1993 |

OTHER PUBLICATIONS

English abstract of RU 2031308 C1 (ASTROSOLAR CO LTD) Mar. 20, 1995.

* cited by examiner

ENERGY SIGNAL PROCESSING SYSTEM

This application is a continuation of International Application AU2006/000754 filed on 2 Jun. 2006, which designated the U.S., claims the benefit thereof and incorporates the same by reference.

FIELD OF THE INVENTION

The present invention relates to an energy signal processing system for emitting and receiving energy signals.

The invention has been developed primarily as a device for emitting, receiving and/or simply reflecting signals off an appropriate reflective surface. Thus, while the invention will be described hereinafter with reference to these applications, it will be appreciated that it is not limited to this particular field of use.

BACKGROUND OF THE INVENTION

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

Devices for emitting or receiving energy signals over a range of positions are known. One such device is the pan-tilt positioning device for a video camera. In this application the energy signal being received is an optical video signal. Typically, this device includes two motor assemblies driving a video camera about a vertical and/or horizontal axis. In this way, video signals may be received over a range of positions based on selective rotation of the motors. A disadvantage of this device is its complexity and the amount of space required to package both motor assemblies.

Another device that transmits an energy signal over a range of positions is the remote mirror module for a radar-emitting/receiving device. In this device, radio waves are emitted onto a reflective element which in turn is rotated about 360° to transmit the radio wave about this range. Returning radio waves are received and read along a reverse path. This device allows radar wave signals to be rotated about the 360° azimuth range whilst the emitting/receiving unit remains stationary. Many remote mirror module type devices are also capable of some zenith motion of the reflective element. A disadvantage of this arrangement is that the mechanism to rotate the mirror is required to be at opposite ends to the emitting/receiving unit. As a result, either the emitting/receiving unit or mirror rotation mechanism is exposed above the main support housing making it vulnerable to damage. Furthermore, having either the emitting/receiving unit or mirror rotation mechanism suspended above the other, necessitates additional support structures, which may create occlusions in the transmission and/or reading path.

Another type of device for sensing energy signals is the static array. In brief, the static array comprises a plurality of sensors disposed at various points around a frame, thereby to sense energy signals coming from various directions. Disadvantageously, since the static array is not moveable, its sensing range is fixed.

It is an object of the present invention to overcome or ameliorate at least one of the disadvantages of the prior art, or to provide a useful alternative.

It is an object of the invention in its preferred form to provide an energy signal processing system that is relatively compact and inexpensive to manufacture and can receive or emit an energy signal about two axes.

SUMMARY OF THE INVENTION

According to one aspect of the invention, there is provided an energy signal processing system including:

a first shaft assembly mounted for rotation about an azimuth axis, said first shaft assembly defining a zenith plane inclined with respect to said azimuth axis;

a second shaft assembly coaxially mounted for rotation about said azimuth axis;

an energy signal processing element rotatably mounted for rotation about a processing element axis that intersects and is generally perpendicular to said azimuth axis; and means for rotating said energy signal processing element about said processing element axis such that at least one of the following is effected:

energy signals travelling substantially along a preselected path axis and impinging said energy signal processing element are processed or deflected substantially along said azimuth axis; or energy signals travelling substantially along said azimuth axis and impinging on said energy signal processing element are deflected substantially along a preselected path axis; or energy signals generated by the energy signal processing element are directed substantially along said preselected path axis.

Preferably, said energy signal processing element is disposed on said azimuth axis and comprises a reflective element arranged to deflect energy signals, travelling substantially along said preselected path axis and impinging it, substantially along said azimuth axis and deflect energy signals travelling substantially along said azimuth axis and impinging it, substantially along said preselected path axis.

Alternatively preferably, said energy signal processing element comprises a sensor for sensing energy signals propagating substantially along said preselected path axis and impinging the energy signal processing element, or an energy signal source for generating energy signal/s.

Alternatively preferably, said energy signal processing element can comprise both a sensor for sensing energy signals propagating substantially along said preselected path axis and impinging energy signal processing element and an energy signal source for generating energy signal/s.

Preferably, said energy signal processing element is rotatably mounted to said second shaft assembly.

Preferably, said preselected path axis is parallel to said zenith plane.

Preferably, the second shaft assembly includes a zenith element constrained by the first shaft assembly for rotation about a scanning axis normal to the zenith plane.

Preferably, rotation of the second shaft assembly with respect to the first shaft assembly, rotates the preselected path axis about the scanning axis.

Preferably, the energy signal deflector includes a transmission element rotatably mounted to the second shaft assembly for rotation about the processing element axis.

Preferably, the zenith element is rotatably mounted to the transmission element for rotation about the preselected path axis.

Preferably, said transmission element includes a limiting aperture coaxially disposed with respect to said preselected path axis to define a predetermined angle of view of the energy signal processing element.

Preferably, said limiting aperture further comprises a protective planar window.

In other embodiments, said limiting aperture further comprises a focussing or collimating element for focussing or collimating an incoming and/or outgoing energy signal/s.

Preferably, said at least one collimating or focussing element is included intermediately said limiting aperture and said processing element.

Preferably, said first shaft assembly is substantially outboard of said second shaft assembly.

Further preferably, the first shaft assembly is at least partially sleeved over the second shaft assembly.

Preferably, the means for rotating the reflective element includes at least one of a mechanical gear assembly, a mechanical linkage assembly, an electromechanical servo drive and an electronic system.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
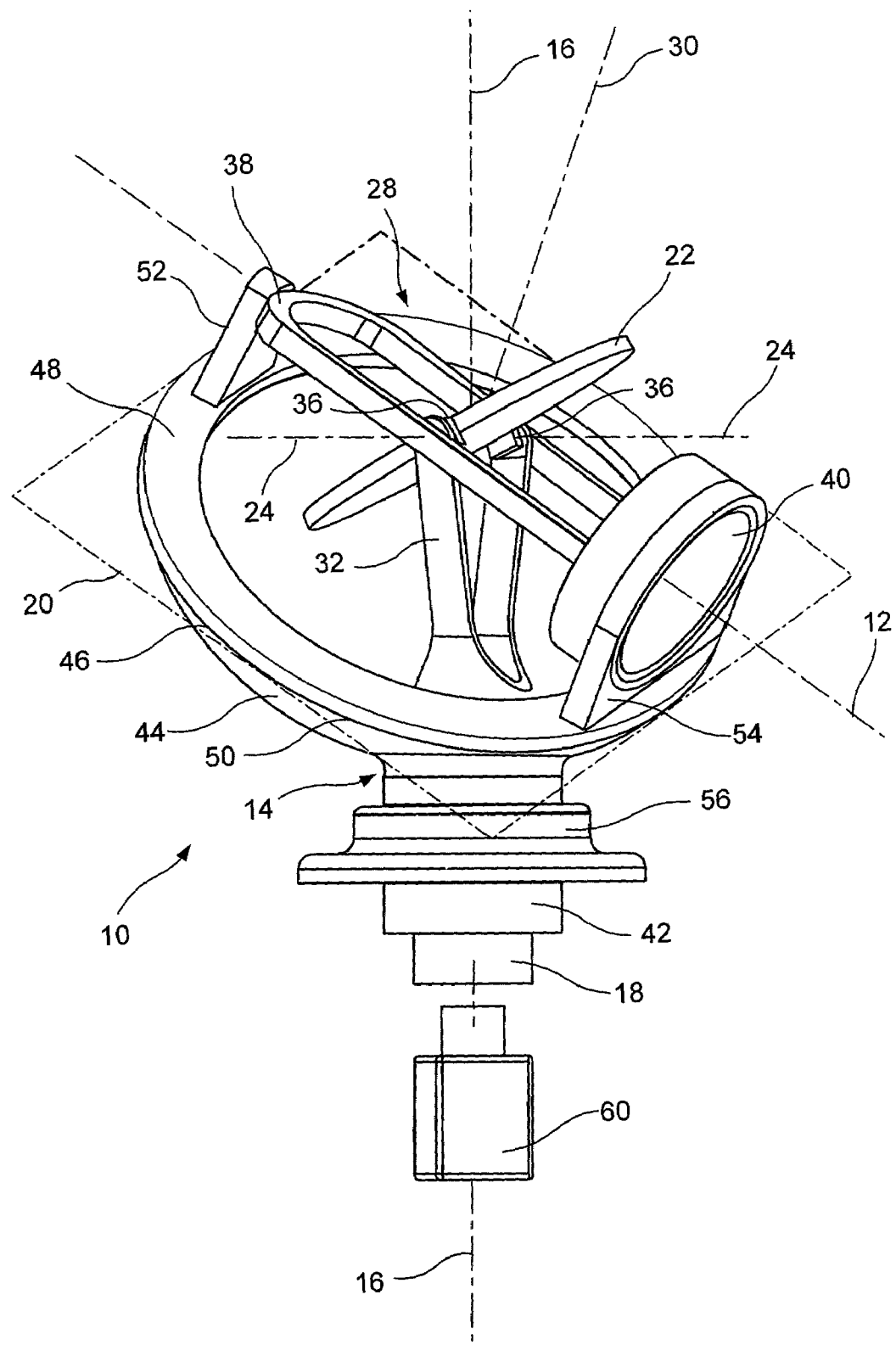
FIG. 1 is a perspective view of an energy signal processing system according to the invention, wherein the energy signal processing element is a deflector.

Referring to the accompanying drawings, there is provided an energy signal processing system 10 for emitting and/or receiving energy signals along a preselected path 12. The processing system includes an outer shaft assembly 14 mounted for rotation about an azimuth axis 16 and an inner shaft assembly 18 coaxially mounted for rotation about the same azimuth axis. The outer shaft assembly extends to define a zenith plane 20, which is inclined with respect to the azimuth axis. It should be understood that the definitions of "azimuth axis" or "zenith plane" only apply in a local frame of reference of the energy signal system. Accordingly, when in use, system 10 can be positioned in any orientation and under any angle with respect to globally defined "azimuth axis" or "zenith plane".

The energy signal processing element in this preferred embodiment of system 10 is a reflective element 22, in the form of a mirror, that reflects energy signals emitted from an associated emitting means 60 or directs signals to an associated sensory means 60. Thus reference 60 is used as a general reference to emitting/sensory means that may or may not be part of the energy processing system. Reflective element 22 intersects the azimuth axis 16 and is mounted to the inner shaft assembly 18 for rotation about processing element axis 24. To this end, the preselected path axis 12 extends parallel to the zenith plane and impinges on the reflective element. The reflective element 22 can be of any shape, material, structure or functionality that geometrically deflects the incoming or outgoing signals as appropriate for the particular application. It is clear that, instead to inner shaft assembly 18, reflective element 22 can be rotatably mounted to transmission element 38 which can then be mounted to the inner shaft assembly 18.

A zenith element 28 is constrained by the outer shaft assembly 14 for rotation about a scanning axis 30, normal to the zenith plane 20. The inner shaft assembly, which is rotatably mounted to the outer shaft assembly by a suitable bearing means (not shown), includes a generally hollow fork member 32 having a shaft 34 extending between its distal ends 36.

A transmission element 38 is mounted to the shaft 34 for rotation about axis 24. The transmission element includes a focussing aperture 40 rotatably mounted to the zenith element 28 such that the aperture is maintained coaxial to the preselected path axis 12 whilst allowing the zenith element to freely rotate about the preselected path axis. The main purpose of aperture 40 is to limit the angle of view and, therefore, the amount of background noise reaching the sensing element, if the system is used to detect signals. The aperture also limits the spread of the output beam leaving the system, when the system is used as a scanning energy signal source. Of course, the system can be used to both receive and emit energy signals. Depending on the application, instead of the focussing optics disclosed in this preferred embodiment, aperture 40 can include just a planar protective window or even no window at all. Aperture 40 can also include collimating, instead of focussing optics. Focussing, collimating or other elements, can be also included at any intermediate point between the aperture and the energy signal processing element. In the preferred embodiment, where the signal processing element is reflective element 22, optical components can be, in fact, introduced anywhere between the aperture and the sensing/emitting means 60. In a typical application, a cover, not shown, is used to cover the arrangement and protect it from the elements, as well as to further minimise the background noise.

Figure 2:
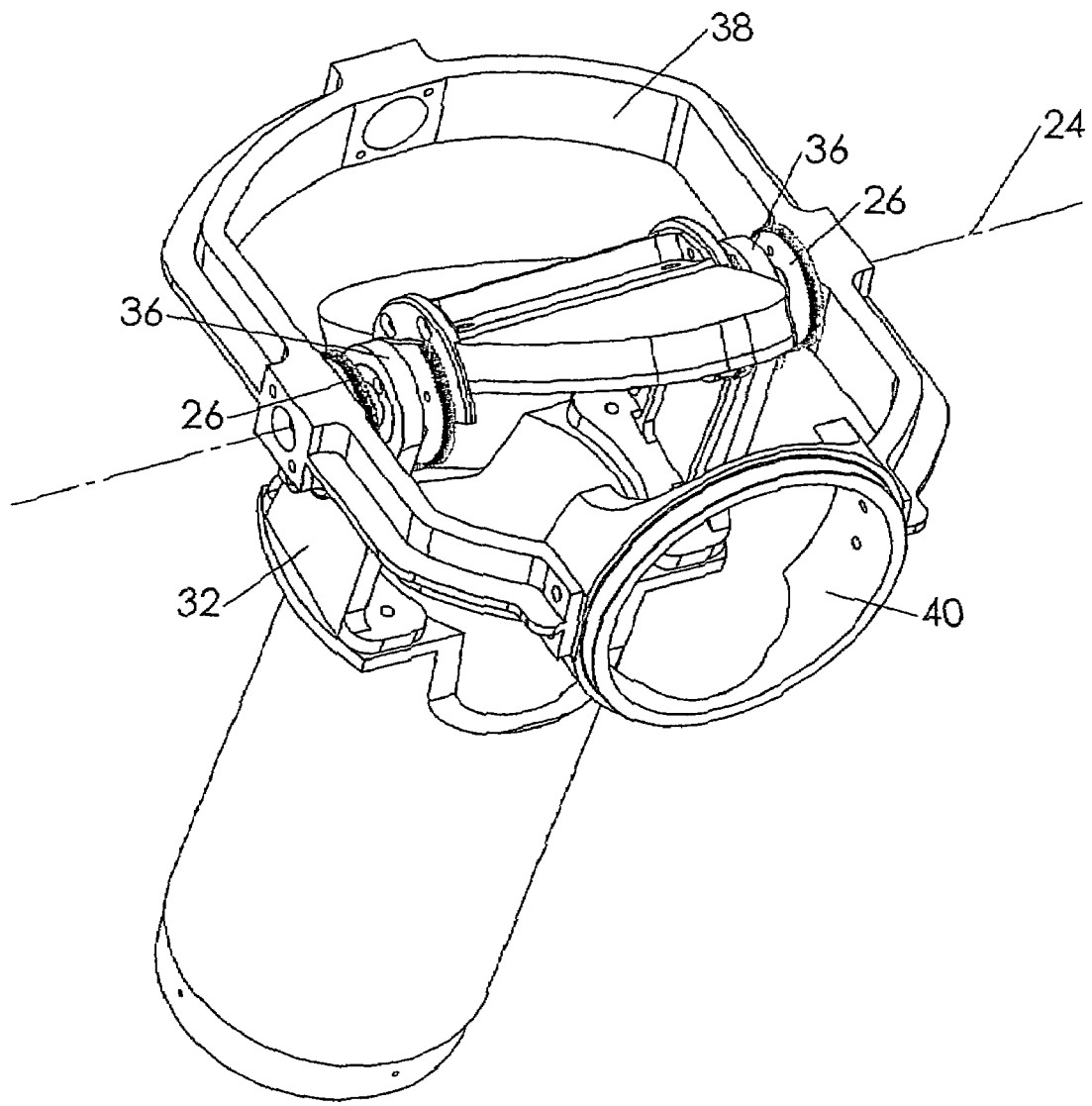
FIG. 2 is a partly disassembled perspective view of another embodiment of the energy signal processing system according to the invention.
Figure 3:
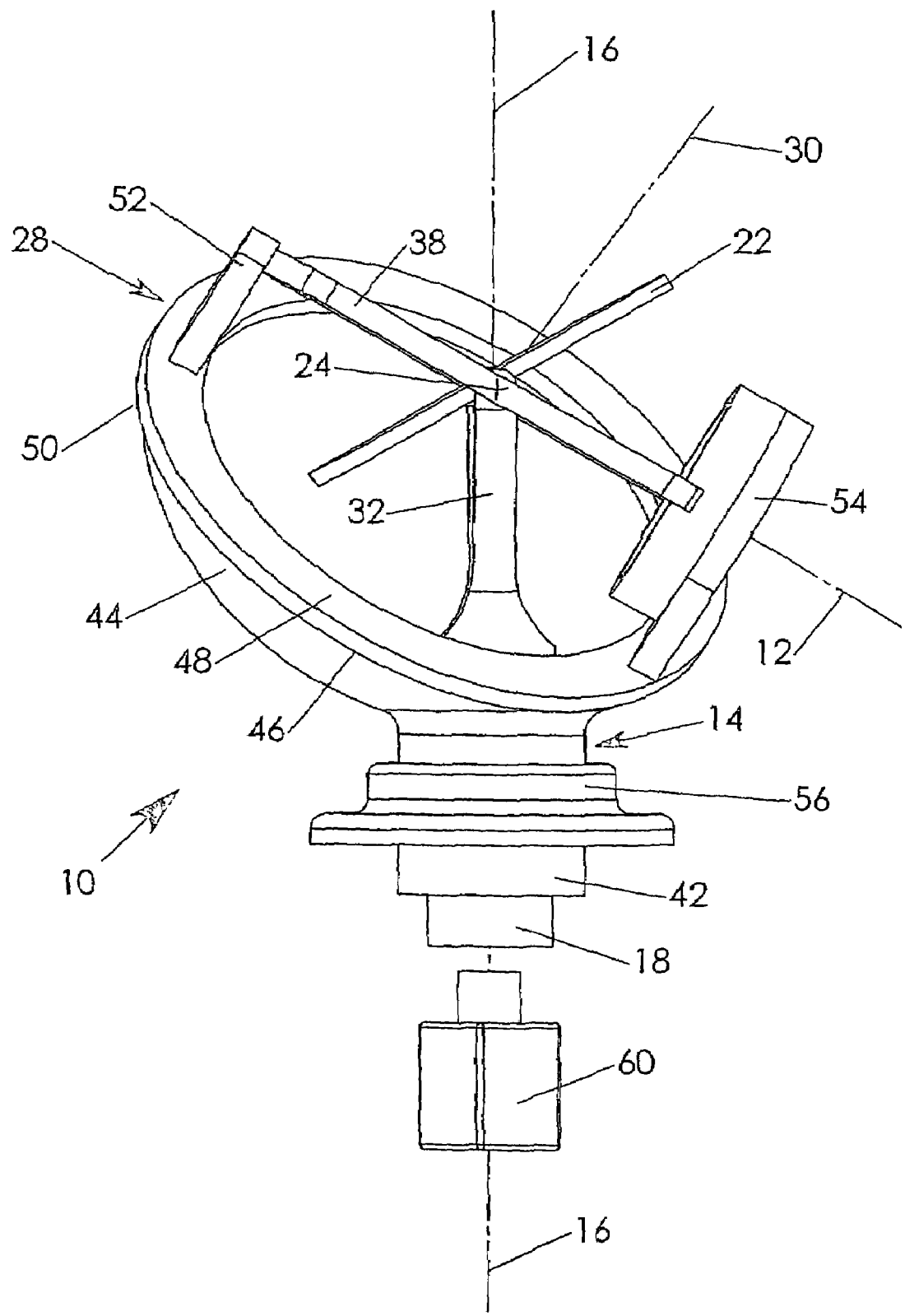
FIG. 3 is a side view of the energy signal deflector of FIG. 1.
Figure 4:
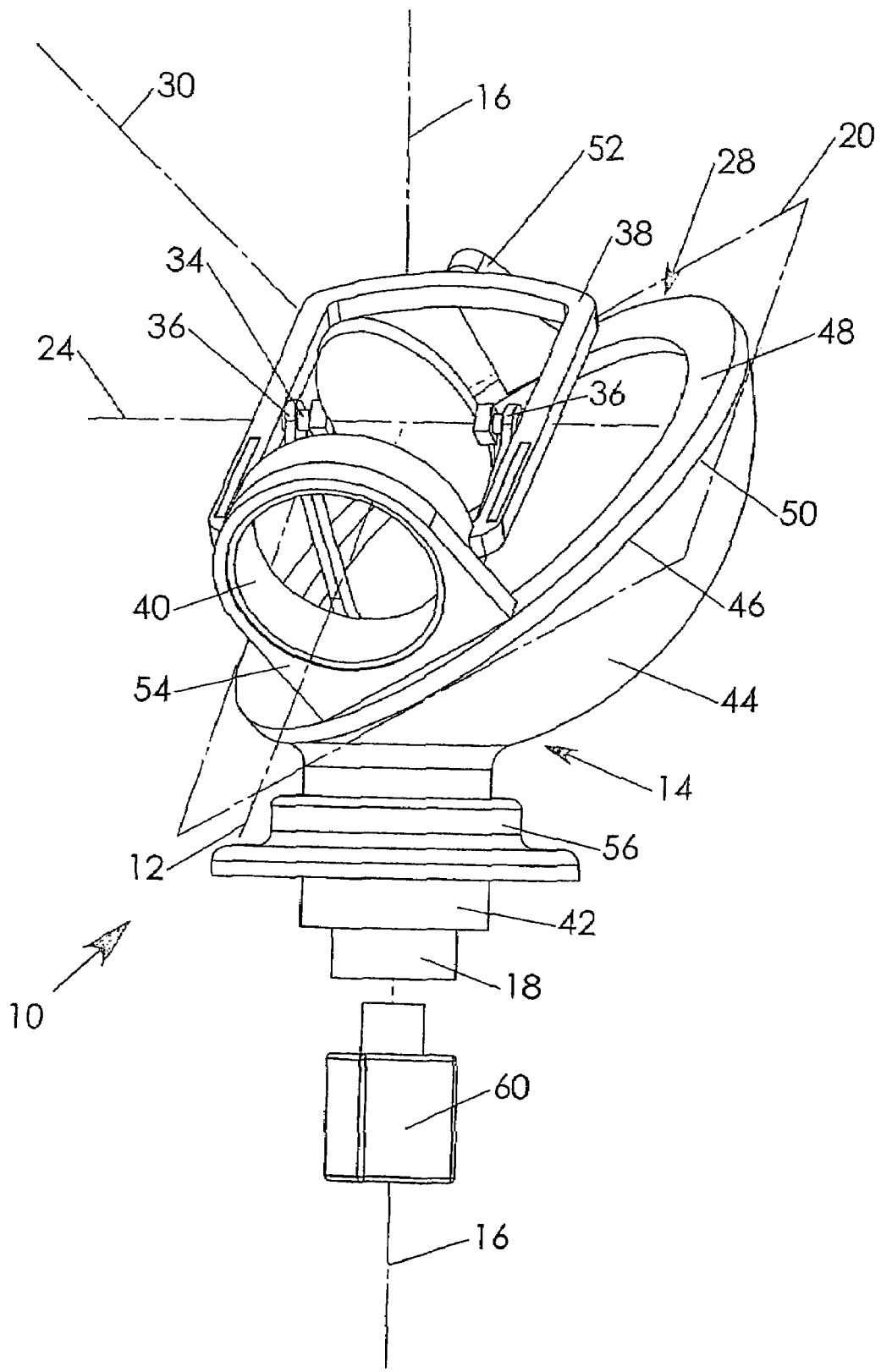
FIG. 4 is another perspective view of the energy signal deflector of FIG. 1.

As shown in the embodiment of FIG. 2, a gear assembly 26 rotatably drives the reflective element about axis 24 such that signals travelling from the focussing aperture 40 and along the preselected path axis 12 are deflected along the azimuth axis 16. Conversely, signals travelling along, or close to, the azimuth axis towards the reflective element are deflected along the preselected path axis to exit via the focussing aperture. The gear assembly 26 derives its input from rotation of the transmission element to rotate the reflective element 22 about axis 24. To this end, the gear assembly maintains the angle of projection of the reflective element such that signals entering along the preselected path 12 are reflected along the azimuth axis. In the same way, signals travelling along the azimuth axis to impinge on the reflective element are reflected along the preselected path axis. It should be appreciated that the above discussed propagation will occur only with signals travelling in parallel, or under small angles with respect to the azimuth axis. The critical angle of propagation will be determined by the geometry of the system and, in particular, by the dimensions of aperture 40, reflective element 22, as well as by the distance between them. Also, in this preferred embodiment, the preselected path axis is parallel to the zenith plane. However, a system can be constructed such that the preselected path axis is inclined with respect to the zenith plane. Such a device would have the same zenith angle range, but this range would be asymmetrical about the horizontal.

The gear assembly 26 may be replaced by other suitable arrangements such as a mechanical linkage; electromechanical servo system; electronic system or a combination thereof. The required motion of the reflective element 22 can also be achieved in a compound way using one of the aforementioned methods for gross motion and another for fine motion of all or part of, the reflective element.

It will be appreciated that conjoined rotation of both the outer and inner shaft assemblies rotates the energy signal deflector 10 about the azimuth axis 16 to provide a 360° rotation of the preselected path axis 12. Furthermore, relative rotation between the outer and inner shaft assemblies rotates the preselected path axis about axis 24.

In the illustrated embodiment, the outer shaft assembly 14 is in the form of a hollow shaft 42 that extends to define a generally hollow and generally spherically shaped body 44 having a circular and planar axially directed edge 46, which defines the zenith plane 20. The zenith element 28 includes a ring portion 48 having a circular and planar abutment surface 50 for sliding engagement between the zenith element and the outer shaft assembly. The zenith element further includes a pair of rotatable supports 52 and 54, each supporting a respective end of the transmission element 38. A base 56, which is rotatably connected to the outer shaft assembly, is provided for generally supporting the device 10.

In the preferred embodiment, the zenith plane is inclined at 45 degrees with respect to a plane perpendicular to the azimuth axis. Therefore, at the two extremes of rotation of the zenith element 28, the preselected path axis 12 may be inclined at a range of plus or minus 45 degrees with respect to a plane perpendicular to the azimuth axis 16. However, in other not shown embodiments, the angle of inclination of the zenith plane and the corresponding range of angles of inclination of the preselected path axis 12 with respect to a plane perpendicular to the azimuth axis may vary from 0 degrees to about 70 degrees, depending on the proposed application.

In operation, when the inner shaft assembly 18 rotates with respect to the outer shaft assembly 14, the fork member 32 rotates the transmission element 38 about the azimuth axis 16. As a consequence, the zenith element is driven to rotate about the scanning axis 30 thereby in turn rotating the transmission element and preselected path axis 12 about axis 24.

In a typical application of the preferred embodiment, a sensory and/or emitting means 60 is disposed below system 10 for sensing signals entering the system and/or generating signals for outputting from the system.

The means 60 can be in the form of a video camera and the energy signals are in the form of light or video signals. Accordingly, the video camera will be able to view anywhere within the full 360 degree azimuth range as well up and down the zenith range by selected rotation of the outer and inner shaft assemblies.

In a further application, the means 60 can be in the form of a radio wave emitter/receiver and the energy signals are radio waves, which travel along the azimuth axis to be deflected along the preselected path axis. Rebounding waves may then be received and interpreted via a reverse path. Accordingly, a continuous rotation of the deflector 10 can provide a continuous 360-degree radar scan, with variations along the zenith range as required.

The system can also be used within a laser range finder arrangement. In view of the above comments, it should be, therefore, clear that the disclosed system can be used for both passive applications, such as sensing signals using sensing elements or video cameras, or active applications, such as range finders or radars.

Figure 5:
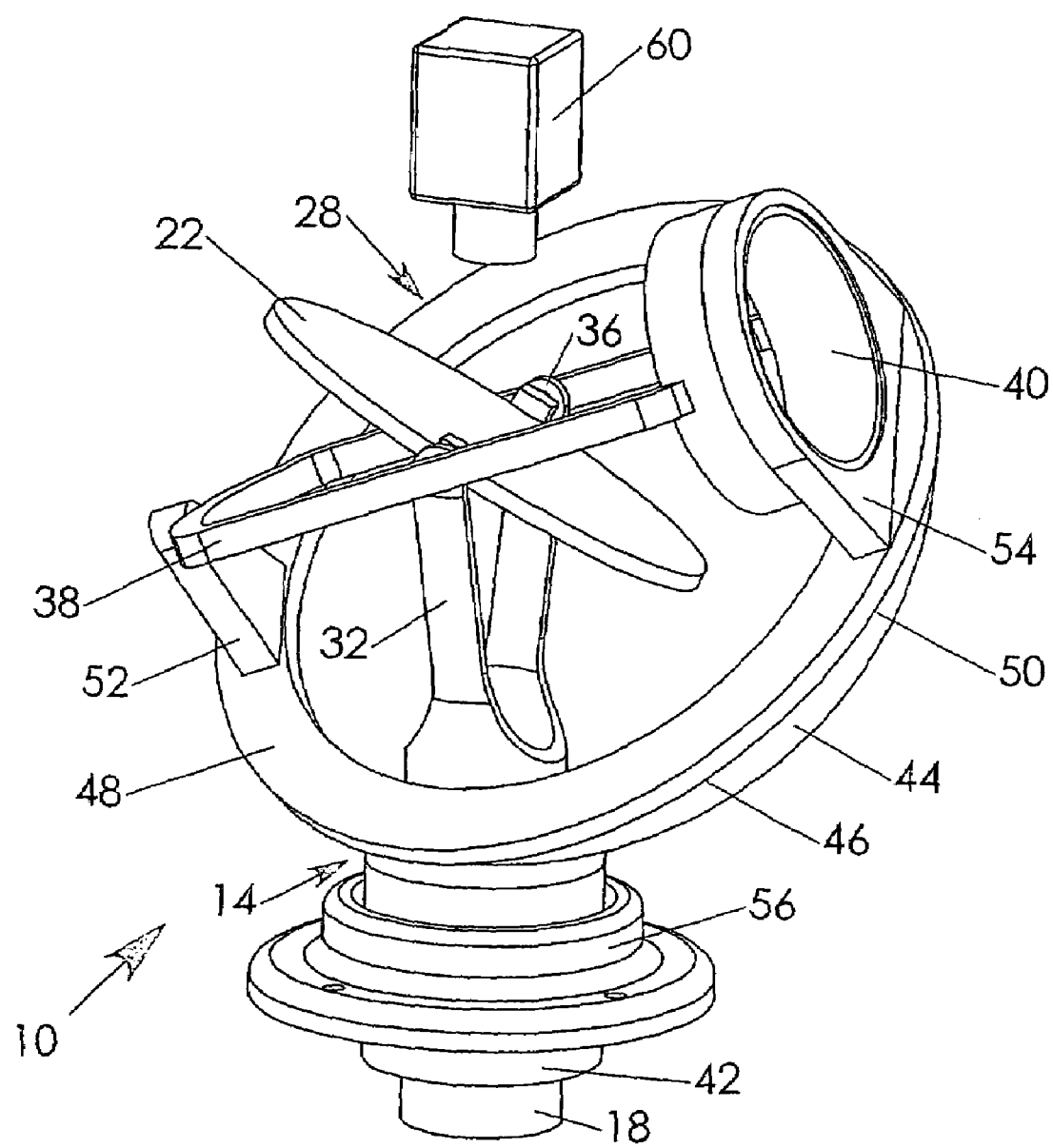
FIG. 5 is a perspective view of another embodiment of the energy signal processing system, according to the invention, where the sensor/emitting element is on the opposite side of the deflector, with respect to the shaft arrangement.

In addition, while in the preferred embodiment illustrated in FIGS. 1 to 4 sensor/emitting means 60 are housed within or below inner shaft assembly 18; they can also be mounted on the other side of reflective element 22, as shown in FIG. 5. The reflective element is driven by similar means as in the preferred embodiment, such that the field of view of the sensor after being deflected by the reflective element is at all times aligned with the aperture. Since the signals do not have to pass through the inner shaft it is no longer necessary for it to be hollow. As with the preferred embodiment, the sensor may be attached to the inner shaft to eliminate image rotation in array type sensors, or it can be isolated from the motion of the energy signal processing system.

It will be appreciated that the energy signal processing system 10 illustrated by the preferred embodiment of the present invention allows the heavier, more fragile and relatively expensive working components to remain relatively stationary, thereby representing a significant packaging advantage over the prior art. The disclosed system is relatively compact and inexpensive. Furthermore, energy transmissions and scans can be advantageously made about both the azimuth and zenith axis in one package.

Although the invention has been described with reference to a specific example, it will be appreciated by those skilled in the art that the invention may be embodied in many other forms.

Figure 6:
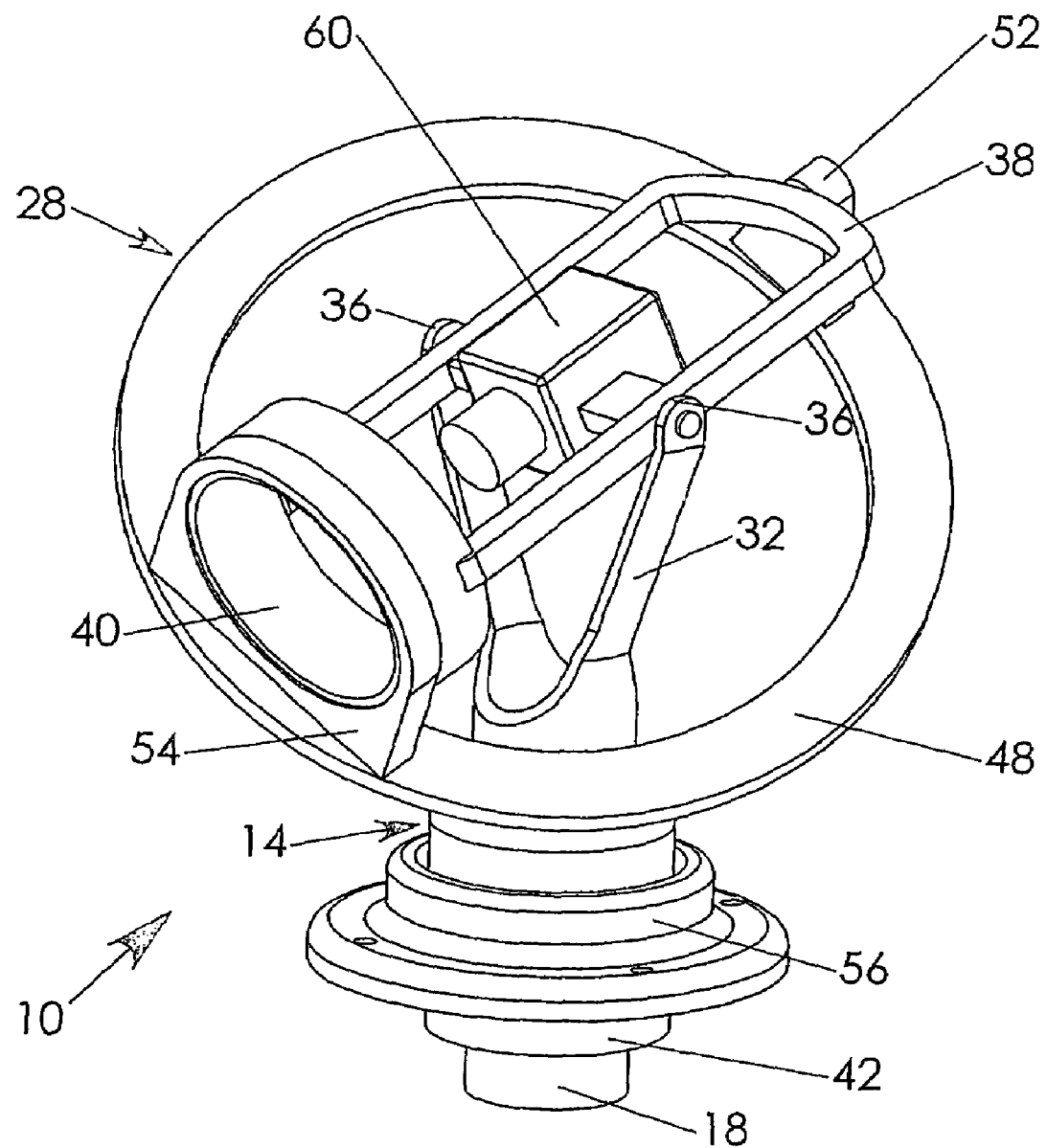
FIG. 6 is a perspective view of yet another embodiment of the energy signal processing system according to the invention, wherein the deflector arrangement of the embodiment in FIG. 1 has been replaced with a detector and/or emitter arrangement.

For example, in an alternative sensor-centric embodiment of the invention, reflective element 22 and the reflective element drive can be replaced with a sensor, as shown in FIG. 6. The sensor is located such that its field of view aligns with aperture 40. It is affixed in such a way that, as the preselected path axis, to which the aperture remains concentric at all times, moves about the azimuth and zenith directions, the sensor field of view remains aligned with the aperture. This would normally be achieved by fixing the sensor to the transmission element, as seen in FIG. 6. The power and signal lines to the sensor would normally pass up through the innershaft. Such configurations are simpler and are especially suitable for high-speed applications. Such applications would usually utilise small and light sensors where the mass of the sensor is comparable with the mass of the reflective element system it replaces, so that the mass of the sensor does not unduly effect the response time of the system.

Instead of a sensor, emitting means, such as a laser, or a combination of sensor/emitting means can also be used instead of, or in addition to, reflective element 22.

It should be appreciated that, while in the embodiments illustrated in FIGS. 1 to 6 the signal processing element is disposed at a particular point along azimuth axis 16, this does not have to be the case. When the signal processing element is in the form of a sensor or a signal source, it can be positioned anywhere along the length of transmission element 38. However, while in this case the signal processing element will not intersect azimuth axis 16, it will be still rotatable around axis 24 that intersects and is generally perpendicular to the azimuth axis.

The invention claimed is:

1. An energy signal processing system for directing energy signals substantially along a preselected path axis, said energy signal processing system comprising:
 a first shaft assembly mounted for rotation about an azimuth axis;
 a second shaft assembly coaxially mounted for rotation about said azimuth axis;
 a zenith element constrained by said first shaft assembly in a zenith plane inclined with respect to said azimuth axis, said zenith element being adapted for rotation about a scanning axis normal to said zenith plane;

a transmission element rotatably mounted to said zenith element and said second shaft assembly, said transmission element being adapted for rotation about a processing element axis that intersects and is substantially perpendicular to said azimuth axis;

an energy signal processing element mounted to at least one of said transmission element and said second shaft assembly and adapted to rotate about said processing element axis as said transmission element rotates, thus maintaining an angle of projection of said energy signal processing element;

wherein rotation of said second shaft assembly with respect to said first shaft assembly causes said transmission element to rotate about said azimuth axis, thereby causing said zenith element to rotate about said scanning axis, thereby causing said transmission element and said preselected path axis to rotate about said processing element axis.

2. An energy signal processing system according to claim 1, wherein said energy signal processing element comprises a reflective element disposed on said azimuth axis, said reflective element arranged to deflect energy signals travelling substantially along said preselected path axis and impinging said reflective element, substantially along said azimuth axis, and to deflect energy signals, travelling substantially along said azimuth axis and impinging said reflective element, substantially along said preselected path axis.

3. An energy signal processing system according to claim 1, wherein said energy signal processing element comprises a sensor for sensing energy signals travelling substantially along said preselected path axis and impinging said energy signal processing element.

4. An energy signal processing system according to claim 1, wherein said energy signal processing element comprises an energy signal source for generating energy signals.

5. An energy signal processing system according to claim 1, wherein said energy signal processing element comprises both a sensor for sensing energy signals travelling substantially along said preselected path axis and impinging said energy signal processing element, and an energy signal source for generating energy signals.

6. An energy signal processing system according to claim 1, wherein said energy signal processing element is rotatably mounted to said transmission element and said second shaft assembly.

7. An energy signal processing system according to claim 1, wherein said preselected path axis is parallel to said zenith plane.

8. An energy signal processing system according to claim 1, wherein said second shaft assembly includes a zenith element constrained by said first shaft assembly for rotation about a scanning axis normal to said zenith plane.

9. An energy signal processing system according to claim 1, wherein rotation of said second shaft assembly with respect to said first shaft assembly causes said preselected path axis to rotate about said scanning axis.

10. An energy signal processing system according to claim 1, wherein said zenith element is adapted to rotate about said preselected path axis.

11. An energy signal processing system according to claim 1, wherein said transmission element includes a limiting aperture coaxially disposed with respect to said preselected path axis to define a predetermined angle of view of said energy signal processing element.

12. An energy signal processing system according to claim 11, wherein said limiting aperture comprises a protective planar window.

13. An energy signal processing system according to claim 11, wherein said limiting aperture comprises a collimating or focussing element for collimating or focussing incoming and/or outgoing energy signals.

14. An energy signal processing system according to claim 11, further comprising at least one collimating or focussing element disposed intermediately between said limiting aperture and said energy signal processing element.

15. An energy signal processing system according to claim 1, wherein said first shaft assembly comprises an outer shaft assembly with respect to said second shaft assembly.

16. An energy signal processing system according to claim 15, wherein said first shaft assembly is comprises a partial sleeve over said second shaft assembly.

17. An energy signal processing system according to claim 1, further comprising rotating means for rotating said energy signal processing element about said processing element axis, wherein said rotating means derives its input from rotation of said transmission element.

18. An energy signal processing system according to claim 1, wherein the angle of inclination of said zenith plane with respect to a plane perpendicular to said azimuth axis is in the range of 0 to 70 degrees.

19. An energy signal processing system according to claim 18, wherein the angle of inclination of said zenith plane with respect to the plane perpendicular to said azimuth axis is 45 degrees.

20. An energy signal processing system according to claim 17, wherein said rotating means comprises one or more rotating means of the group consisting of a mechanical gear assembly, a mechanical linkage assembly, an electromechanical servo drive and an electronic system.

21. An energy signal processing system according to claim 1, wherein conjoined rotation of said first and second shaft assemblies causes said energy signal processing element and said preselected path axis to rotate about said azimuth axis.

22. An energy signal processing system according to claim 1, wherein said azimuth, scanning, and processing element axes intersect.

23. An energy signal processing system according to claim 1, wherein said azimuth, scanning, processing element, and preselected path axes intersect.

* * * * *